(12) United States Patent
Robinson

(10) Patent No.: US 9,743,032 B2
(45) Date of Patent: Aug. 22, 2017

(54) METHOD AND SYSTEM FOR CONFIGURING A REMOTE CONTROL DEVICE

(71) Applicant: Echostar UK Holdings Limited, Keighley (GB)

(72) Inventor: David Robinson, North Yorkshire (GB)

(73) Assignee: EchoStar UK Holdings Ltd. (GB)

( * ) Notice: Subject to any disclaimer, the term of this patent is extended or adjusted under 35 U.S.C. 154(b) by 0 days.

(21) Appl. No.: 14/530,357

(22) Filed: Oct. 31, 2014

(65) Prior Publication Data

US 2015/0131008 A1    May 14, 2015

(30) Foreign Application Priority Data

Nov. 8, 2013 (EP) .................................... 13192202

(51) Int. Cl.
*H04N 21/422* (2011.01)
*H04N 5/44* (2011.01)
*G08C 17/02* (2006.01)

(52) U.S. Cl.
CPC .......... *H04N 5/4403* (2013.01); *G08C 17/02* (2013.01); *H04N 21/42226* (2013.01); *G08C 2201/20* (2013.01); *G08C 2201/30* (2013.01); *G08C 2201/92* (2013.01); *H04N 21/42225* (2013.01); *H04N 2005/4435* (2013.01)

(58) Field of Classification Search
CPC .......... H04N 21/4394; H04N 21/4728; H04N 21/8106; H04N 7/04; G06F 3/165; G10L 25/30; G10L 25/57
See application file for complete search history.

(56) References Cited

U.S. PATENT DOCUMENTS

2006/0047513 A1* 3/2006 Chen ................... H04M 1/7253
704/246
2007/0052547 A1    3/2007 Haughawout et al.

FOREIGN PATENT DOCUMENTS

GB          2286277 A      8/1995

OTHER PUBLICATIONS

European Patent Office, Extended European Search Report, dated Apr. 14, 2014 for European Patent Application No. 13192202.3.
NEC Infrared Transmission Protocol dated Nov. 6, 2013.

* cited by examiner

*Primary Examiner* — Michael Teitelbaum
(74) *Attorney, Agent, or Firm* — LK Global

(57) ABSTRACT

Methods and systems are presented for configuring a remote control device to operate multiple devices. Functionality is provided to detect whether the remote control device has been configured to control one of the devices. If the remote control has not yet been configured to operate another device, the user is invited to configure the remote control accordingly. Detection may be based on additional codes transmitted with the remote control device that indicate the configuration status of the remote control. Detection may be additionally or alternately based on user behavior that is identified as consistent with operation of an un-configured remote control.

20 Claims, 4 Drawing Sheets a)

> Would you like to set-up the remote control now?
>
> Green Button, Yes
>
> Red Button, No
>
> Do not ask me again, Blue b)

> Enter manufacture and model of television.

c)

> Press the left and right directional buttons to enter the remote control configuration mode.

d)

> Press the Volume Up button.
>
> Press numbers 4689

*Fig. 4*

METHOD AND SYSTEM FOR CONFIGURING A REMOTE CONTROL DEVICE

CROSS-REFERENCES TO RELATED APPLICATIONS

This application claims priority to European Patent Application No. 13192202.3 filed Nov. 8, 2013.

TECHNICAL FIELD

The following discussion relates to methods and systems for configuring a remote control device, and in particular to an integrated receiver/decoder apparatus and/or remote control with such functionality.

BACKGROUND

The remote control devices of integrated receiver/decoder apparatus, such as Set Top Boxes (STB), are often provided with the ability to control the operation of other connected audio visual (AV) equipment, such as televisions, video playback devices, and amplifiers. This allows the user to pick up only a single remote control (the STB remote control) to control both the STB, with which it is supplied, and the other equipment. Typically, the types of operation that can be controlled is limited to volume control, switching the power on and off, selecting which AV input is to be viewed on a display screen, and which television channel is to be viewed. However, more complicated remote controls exist that allow control of wider functionality, and simultaneous control of more than one device.

Remote controls shipped for use with a STB are programmed to operate with the STB by default. The memory of the remote control stores the necessary address and commands signals appropriate for the STB with which it is to be used. To control the operation of other AV devices, such as connected audio visual equipment, the STB remote control must also store in memory the necessary address and command information for the other device, and must then be configured or programmed to communicate with that device by means of those control codes. For example, if the remote control is to be able to control the power, volume, channel selection, or input mode of a television receiver, it will need to store or be programmed with the address and command data for controlling that television.

Many STB remote controls will be pre-programmed with a plurality of candidate address and command codes for controlling different models of AV equipment produced by different manufacturers. As it is not possible to predict the device a user will connect to the STB, the user is usually required to follow a configuration procedure to set up the remote control for their connected device. This procedure can be complex.

Typically, a configuration procedure involves quickly depressing the power button on the remote control to enter a programming mode, followed by subsequent presses of the up and down directional buttons on the remote control keypad. This causes the remote control to cycle through the address and command codes pre-stored in memory in an attempt to identify codes that control the connected audio equipment. Usually the control code that is transmitted is the power off signal, so if the STB remote is to be programmed to control a television device that is powered on, the user will know that they have found the correct code via the programming operation, when the TV turns off. The user can then press another button (the pound or # key for example) to exit the programming mode and save the identified code in memory for future use. In this way, the power control command that is identified as being appropriate for controlling the connected television can be used as a key into the other control codes (such as for volume, input mode, channel) that are pre-stored in memory.

Alternatively, the necessary remote control codes for each television and audio/visual device that may be controlled by the remote control device may be made available via the publication of paper or electronic manuals. To program a remote control, a user would then press a pre-set combination of keys on the remote control to enter a programming mode, and subsequently to enter the appropriate remote control codes identified in the manual.

Other remote control devices may learn the appropriate control codes for operating another device during a remote control training procedure. The user presses a key combination instructing the remote control to enter a learning mode. The user then presses a key on the remote control being programmed and a corresponding key on the dedicated remote control for the connected device. The remote control being programmed detects the command transmitted by the dedicated remote control and stores this in memory for the key that had been depressed. This process continues until all of the desired keys have been programmed.

The process of programming a remote control can however be confusing or troublesome for some users, who may choose instead to abandon the programming process and leave the remote control programmed only to operate with the STB. This means that the additional functionality of the STB is not being fully used. It also means that the user may experience difficulties later in operating the STB connected equipment.

For example, many STBs have a built-in volume control that sets the volume of the television signal output to the connected television. The television may also amplify this signal using its own volume control before output at connected speakers. There are therefore two volume controls connected in series, one for the STB and one for the television. The built-in volume control on the STB is useful, as it avoids the need to change the volume control on the television. However, where the STB remote control is not programmed to operate the television, a user may forget about one or the other of the volume controls, and having accidentally set the volume to mute or a low value on the STB wonder why the television volume is difficult to hear.

We have appreciated that it would be desirable to improve the communication between remote control, STB and connected AV equipment so that full remote control functionality is available to the user.

SUMMARY

Various embodiments are defined in the independent claims to which reference should now be made. Advantageous features are set out in the dependent claims.

In a first aspect, various embodiments provide a method for configuring a remote control device, wherein the remote control is pre-programmed with control codes for controlling a first audio/visual device and is programmable with control codes to control a second audio/visual device, the method comprising: detecting an indication at the first audio/visual device, that the remote control is unconfigured with respect to control of a second audio/visual device; and controlling an audio or visual output of the first audio/visual device to prompt the user to configure the remote control to control the second audio/visual device, and outputting instructions via the audio or visual output for configuring the remote control.

The instructions output via the audio or visual output may prompt the user to press a key on the remote control to be programmed, and enter a sequence of keys on the remote control to configure that key for control of the second audio/visual device.

The method may comprise, in the detecting step, the first audio/visual device analysing commands received from the remote control for the presence of a signal indicating whether the remote control is in an unconfigured state with respect to control of the second audio/visual device.

The commands received from the remote control may comprise a plurality of data bits and the signal comprises one or more dedicated data bit in the plurality of data bits indicating whether the remote control is configured to control a second audio/visual device.

The method may comprise, in the detecting step, the first audio/visual device analysing the pattern of key presses made by the user via the remote control and based on the pattern of key presses determines whether the remote control is unconfigured to control a second audio/visual device.

The method may further comprise the first audio/visual device outputting audio/visual data at a user controlled volume setting, and: the first audio/visual device querying the volume setting for the output of audio/visual data; the first audio/visual device analysing the key presses made by the user via the remote control; if the volume setting is at a maximum, and the first audio/visual device receives via the remote control a plurality of volume-up commands, determining that the remote control is unconfigured to control a second audio/visual device.

The method may comprise, if the first device identifies that the user presses multiple times remote control keys that are programmable, determining that the remote control is unconfigured to control a second audio/visual device.

The instructions output via the audio or visual output may prompt the user to input the model number and manufacturer of the second audio/visual device to the first device.

Controlling an audio or visual output of the first audio/visual device may include outputting commands to update a display screen of a connected device, displaying instructions for configuring the remote control on the display screen, awaiting key presses on the remote control according to the instructions, and/or notifying the user if the user enters incorrect key presses.

In a second aspect, various embodiments may provide an audio/video device comprising: a processor for controlling the operation of the audio/video apparatus; a remote control command receiver for receiving commands from a corresponding remote control, wherein the remote control is pre-programmed with control codes for controlling the audio/visual device and is programmable with control codes to control a second audio/visual device, the commands received from the remote control being received and interpreted by the processor; an audio or visual output for outputting audio or visual data to a user; wherein the processor is operable to: receive commands from the remote control; detect that the remote control is unconfigured with respect to control of a second audio/visual device; and control the audio or visual output to prompt the user to configure the remote control to control the second audio/visual device, and output instructions via the audio or visual output for configuring the remote control.

The instructions output via the audio or visual output may prompt the user to press a key on the remote control to be programmed, and enter a sequence of keys on the remote control to configure that key for control of the second audio/visual apparatus.

The audio/visual device may be operable to analyse commands received from the remote control for the presence of a signal indicating whether the remote control is in an unconfigured state with respect to control of the second audio/visual device.

The commands received from the remote control may comprise a plurality of data bits and the signal comprises a dedicated data bit in the plurality of data bits indicating whether the remote control is configured to control a second audio/visual device.

In the detecting step, the first audio/visual device may be operable to analyse the pattern of key presses made by the user via the remote control and based on the pattern of key presses determines whether the remote control is unconfigured to control a second audio/visual device.

The first audio/visual device may be operable to output audio/visual data at a user controlled volume setting, and processor is operable to: query the volume setting for the output of audio/visual data; analyse the key presses made by the user via the remote control; if the volume setting is at a maximum, and the processor receives via the remote control a plurality of volume-up commands, determine that the remote control is unconfigured to control a second audio/visual device.

If the processor identifies that the user presses multiple times remote control keys that are programmable, the audio/visual device may determine that the remote control is unconfigured to control a second audio/visual device.

The instructions output via the audio or visual output may prompt the user to input the model number and manufacturer of the second audio/visual device to the first audio/visual device.

Controlling an audio or visual output of the first audio/visual device includes outputting commands to update a display screen of a connected device, displaying instructions for configuring the remote control on the display screen, awaiting key presses on the remote control according to the instructions, and/or notifying the user if the user enters incorrect key presses.

In a third aspect, the invention provides a remote control for controlling an audio/visual apparatus, wherein the remote control is pre-programmed with control codes for controlling the audio/visual device and is programmable with control codes to control a second audio/visual device, the remote control comprising: a plurality of input controls; a transmitter for transmitting remote control commands to the audio/visual apparatus; a memory for storing a configuration status signal indicating that the remote control is configured or unconfigured to control a second audio/visual device; a processor for detecting a selection of an input control and operating the transmitter to send a remote control commands to the audio/visual device based on the selection of an input control by a user; wherein the processor is operable to transmit a signal to the audio/visual device based on the configuration status signal.

The transmitter may transmit remote control commands comprising a plurality of data bits and the processor sets a dedicated data bit in the plurality of data bits based on the configuration status signal.

In a fourth aspect, the invention provides a computer program readable medium on which computer code is stored, wherein when the computer code is executed by the processor of an audio/visual apparatus, the audio visual device is caused to carry out the steps of the method.

BRIEF DESCRIPTION OF THE DRAWINGS

Example embodiments will now be described with reference to the drawings in which:

FIG. 4 is an example of an on-screen graphical user interface guiding the user through a remote control configuration process.

DETAILED DESCRIPTION

We have appreciated that it would be desirable to provide a device that guides a user through the set up process for a programmable remote control device. We have also appreciated that it would be desirable to have the remote control feedback its status to the device so that the device can monitor the operation of the remote control and ensure that it is acting optimally. In various embodiments, the device is a set top box (STB) with which the remote control is provided.

For simplicity the following discussion will refer to the operation of a STB with a connected television, using a STB remote control to control both the STB and the television. However, it will be appreciated that example embodiments of the invention may include any integrated receiver/decoder (IRD) instead of the STB. Additionally, instead of an STB and television, the STB and connected audio visual equipment may be any one of more of home theatre equipment, stereo equipment and speakers, games consoles, computers, DVD and Blu-ray™ players.

Figure 1:
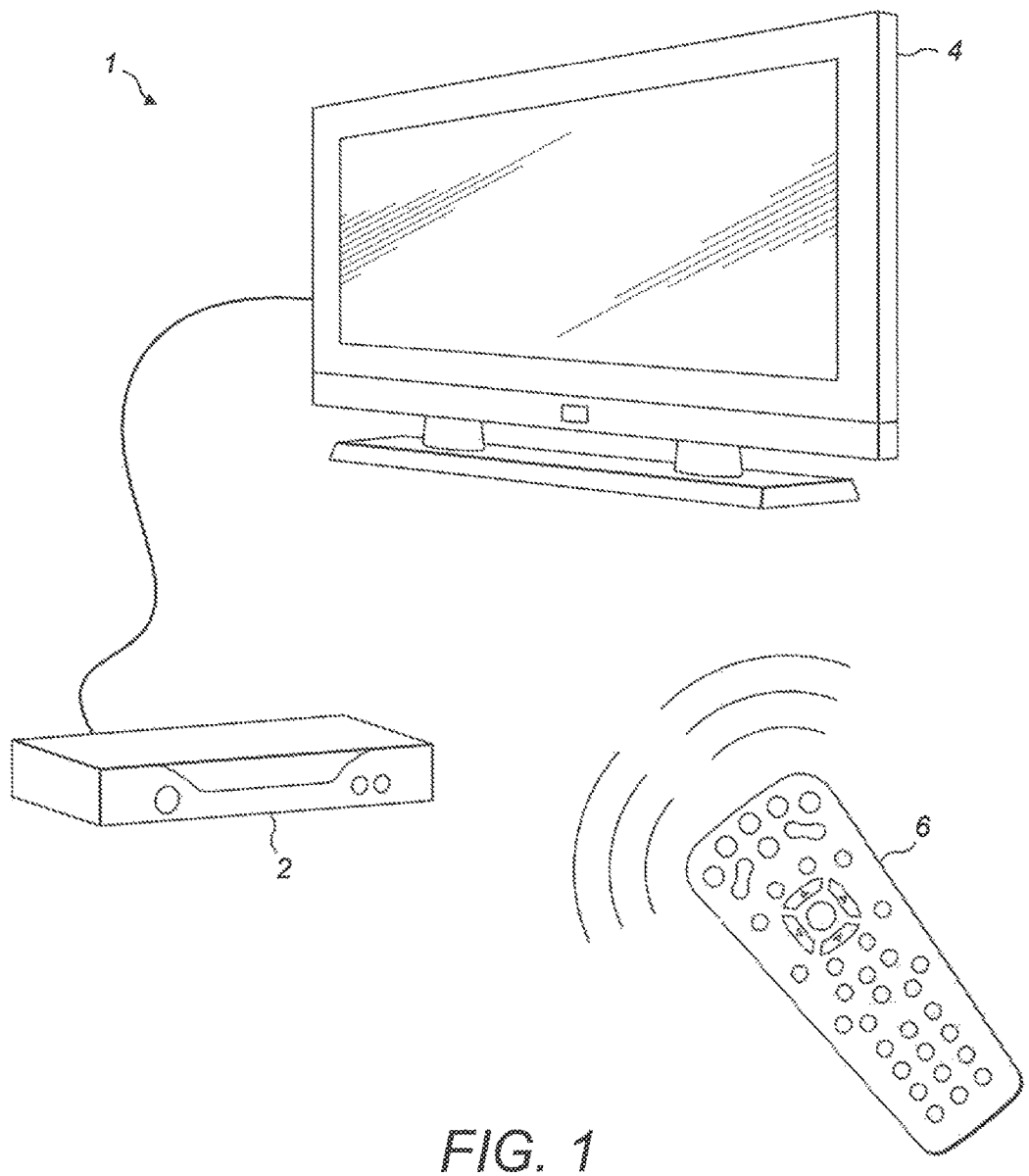
FIG. 1 is a schematic illustration of a home entertainment system, comprising a STB and television with remote control operation.

FIG. 1 is a schematic illustration of a home entertainment system 1 comprising a set-top box (STB) 2, and a connected television 4. The STB 2 is controlled by a remote control device 6. Remote control device 6 communicates wirelessly with the STB by infra-red (IR) signals. Alternatively, the communication may be via RF signals (for example FM modulated UHF signals, the RF4CE protocol, etc) or any other suitable mechanism. The home entertainment system 1 may comprise one or more other audio visual devices, such as theatre equipment, stereo equipment and speakers, games consoles, computers, DVD and Blu-ray™ players. These are omitted from the diagram for simplicity.

Figure 2:
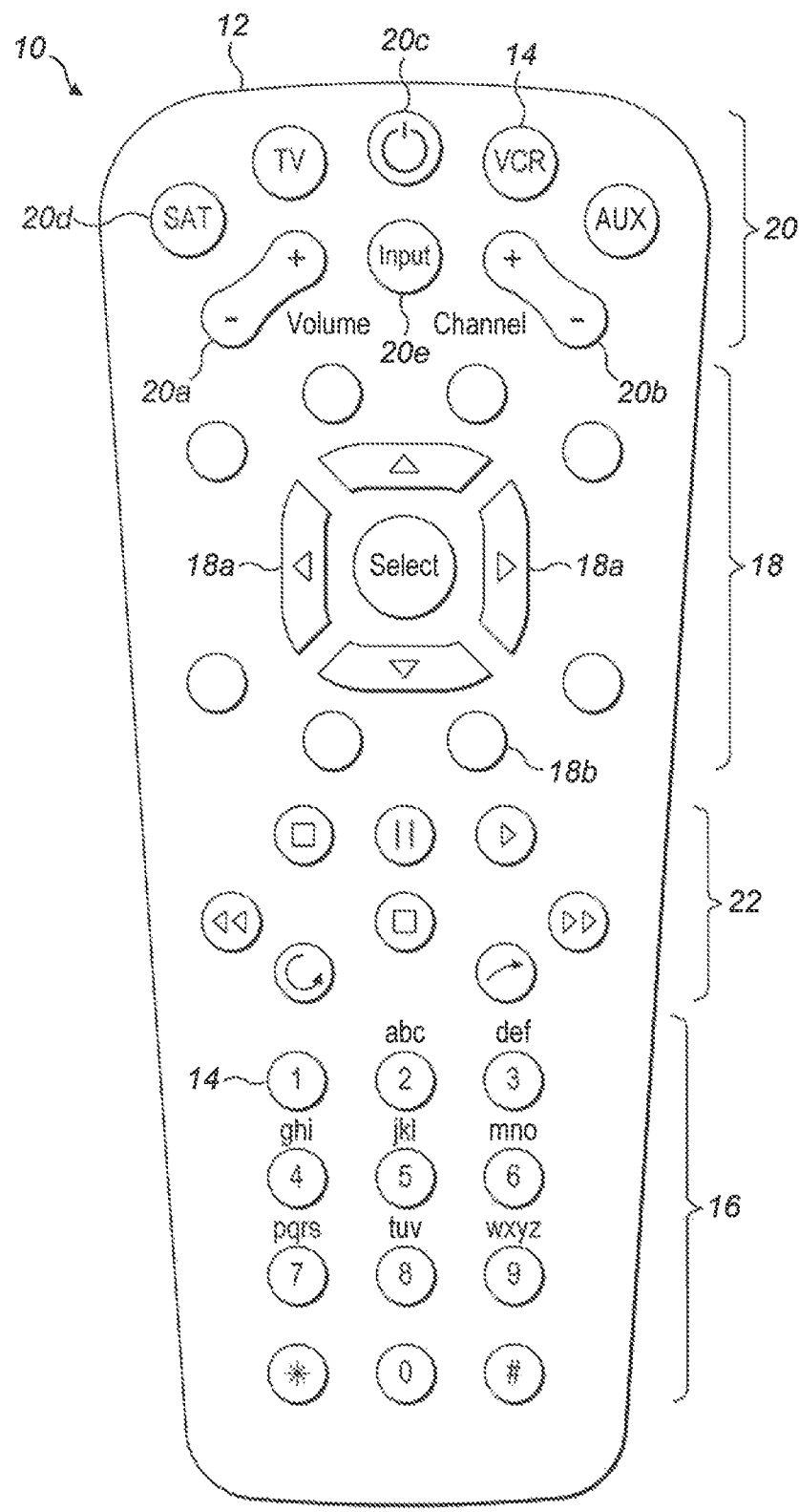
FIG. 2 is a simplified illustration of an example remote control device, such as that illustrated in FIG. 1.

FIG. 2 is a simplified illustration of a remote control device 10, such as the remote control device 6 appearing in FIG. 1. The term remote control device will be abbreviated to remote control in the following description. The remote control 10 is understood to be that provided for use with the STB 2.

As is generally understood, the remote control 10 comprises a housing 12 on which a plurality of buttons 14 are provided. The remote control communicates with a STB or connected television by means of an Infra-Red transmitter/receiver (not shown) or other means well known in the art. The buttons are generally grouped by their function. A first grouping includes number buttons 16, arranged as an alpha numerical keypad, via which a user may enter channel numbers, text data, as well as the pound #, and asterisk * characters. A second grouping includes directional buttons and menu option buttons 18, such as up, down, left, right, and select buttons 18a, as well as a number of associated function keys 18b. These keys are useful used to navigate through menu options for the remote control or connected set top box, as well as an electronic program guide (EPG) for example. Another grouping includes general function keys, such as volume up and down buttons 20a, channel change (up and down buttons) 20b, power on and off button 20c, control selector buttons 20d (typically including a TV button, a SAT or Satellite button, a VCR or Video recorder button, and an AUX or auxiliary device button), as well as input select button 20e.

Optional buttons 22 may also be provided for controlling another connected audio visual device such as a VCR, DVD, or Blu-Ray™ player. Buttons may therefore be provided for the functionality specific to such devices, such as PLAY, PAUSE, STOP, REWIND, FAST FORWARD, SKIP FORWARD and SKIP BACK. Other functions are possible.

Where the remote control has been configured to operate with the TV, the TV control selector button 20d toggles the functionality of the remote control 10 between controlling the STB and controlling the TV. For example, by depressing the TV control selector button 20d, the power on/off button 20c can be made to control the STB or the television alternately. The same is true of the other control selector buttons 20d for the devices named on them, such as Satellite, VCR and AUX devices. For simplicity, the discussion in this application will focus on use of the TV selector button, but it should be understood that in all respects similar functionality as that to be described may be conferred on other devices by using the other control selector buttons. It is also important to realise that some buttons on the remote control may control the STB, even after the TV control selector button 20d is pressed, and similarly that some buttons on the remote control may control the TV even if the TV control selector button has not been pressed. For example in an alternative design of remote control, there may be a dedicated STB power button and a dedicated TV power button, such that the operation of either button is not affected by pressing the TV control selector button. In another design of remote control there may be no control selector buttons, and the operation of every button is individually fixed to either the STB or the TV.

The volume control button 20a is a good example of a different class of buttons, which in some designs are not altered by use the use of control selector buttons, but that are not individually allocated to only one of the STB or the television. The volume control button for example will in the first instance control the volume setting on the signal output from the STB. However, where the remote control has been configured to operate with the television, the volume control will control the television volume setting only, the STB volume being set at a fixed or predetermined value.

Where the remote control has been configured to operate with the television, the input select button 20e will select an input to display on the screen of the television.

The remote control 10 comprises control circuitry configured to process the key presses received via the plurality of keys 14, and an infra-red receiver/transmitter to transmit the appropriate control code to the STB, or to the television if configured. The interior of the remote control also has a memory in which the control codes are stored, as well as a processor for reading the memory in response to key presses and instructing the infra red receiver/transmitter to transmit an appropriate signal corresponding to the code.

The encoding of infra-red signals for remote control of a respective STB or audio visual device are usually established by standards bodies or private companies that may then license or give the technology to third parties. The encoding has two parts, an encoding protocol which seeks to capture and convey the function of the key that is pressed using a logical or numerical code, as well as a scheme for transmitting the appropriate logical or numerical code to the associated device. For example, the NEC® Infra red transmission protocol uses two bytes of data to define both a device address, and a device command. The address portion of the signal allows the command to be addressed to a particular device. This means that other AV equipment in range of the remote control can ignore commands that are not intended for them. Using one byte of data for the commands means that only 256 different commands can be encoded. However, as these commands are specific to the device address, they can be specially tailored to the intended device.

A code appropriate for the selected key is transmitted by the remote control via the transmission scheme. In the NEC® example, pulse distance encoding of the address and command bits is used, that is a one bit is a pulse (a 560 us 38 kHz carrier burst) followed by a space of 2.25 ms, while a zero is a pulse followed by a space of 1.12 ms. The address and command data is transmitted twice in succession, the second time the data bits are inverted, so that basic error checking can be performed. The address and command signals are usually transmitted once, and periodically a repeat command is transmitted, for as long as the key is held down.

The memory of the remote control stores the address and commands appropriate for the STB with which it is intended to be used. However, the remote control also stores control codes for other devices with which it is intended to operate. These control codes allow the remote control to control the power, volume, channel selection, or input mode of a television receiver. The memory therefore stores the address and command data for controlling that television, or is programmable with such information in use.

For example, power button 20c will by default be associated with the power on-off command for the STB. However, if the remote control has been programmed to operate with a television, the memory of the remote control will store the television address and power on-off command for the television, and the remote control processor will detect send the appropriate power on/off command to the STB or to the television depending on the state of the TV select key god.

In an embodiment, an STB 2 and a remote control 10 are provided. As described above the remote control has control circuitry configured to process the key presses received via the plurality of keys 14, and an infra-red receiver/transmitter to transmit the appropriate control code to the STB, or to the television if configured. The interior of the remote control also has a memory in which the control codes are stored as well as a processor for reading the memory in response to key presses and instructing the infrared receiver/transmitter to transmit an appropriate signal corresponding to the code. The remote control is pre-programmed with control codes for controlling the STB and is also programmable with control codes to control a second audio/visual device. In embodiments of the invention, the memory of the remote control may also store a configuration status signal indicating whether the remote control is configured to control a second audio/visual device or not.

Similarly, the STB 2 will be understood to have at least a processor for controlling the operation of the STB, a processor for controlling the operation of the audio/video apparatus and a remote control command receiver/transmitter for receiving commands from a corresponding remote control. The STB also comprises an audio or visual output for outputting audio or visual data to a user. The output may be an AV output socket at which a cable may be attached for connecting the STB to a second audio/visual device, such as a display. In alternative embodiments, the audio or visual output may be a display screen or speaker on the housing of the STB. The STB also comprises a memory storing any necessary control instructions and operational data.

The remote control 10 and the STB 2 otherwise operate according to their usual control programming to allow the user to control the playback of AV content through the STB. Additional functionality is also provided in the STB and/or remote control to detect whether the remote control device has been configured to control another device such as a television connected to the STB. Detection may be based on additional codes transmitted with the remote control device to the STB that indicate the status of the remote control, that is whether it has been configured or not. Alternatively detection may be based on identifying regular codes transmitted from the remote control to the STB which correspond to functions which would not be carried out by the STB if the remote control had been configured, for example volume control following pressing the TV control selector button 20d. Further, alternatively or in addition, detection may be based on the behaviour of the user being identified as consistent with a user operating an unconfigured remote control.

If the STB detects that the remote control has not yet been configured to operate another device, it invites the user to program the remote control accordingly. If the user accepts the invitation, on-screen prompts may be displayed or verbal instructions broadcast from the STB to guide the user through the programming process. The on-screen prompts may be in the form of a wizard, that is a number of consecutive screens displayed on a television screen connected to the STB, that contain instructions and which correspond to one or more steps of the remote control configuration process. Alternatively, instructions may be displayed on a display on the housing of the STB.

Operation to detect whether the remote control has been configured will now be described. It will be assumed that when a user purchases an STB together with corresponding remote control, the remote control will not yet be configured to control any device other than the STB with which it was provided.

In a first example, the infrared transmission protocol used between the remote control and the STB is modified. In particular, the modified protocol includes a dedicated data bit that is to be transmitted with each command from the remote control 6 to the STB. The dedicated data bit acts as a device status data marker or flag and is used to signal to the STB the state of the remote control, in particular whether or not it has been programmed to operate with another associated audio visual device, or whether it is still in its default setting (configured to operate with the STB only).

Where the command code portion of the infrared transmission protocol is defined by a byte of data (such as in the scheme discussed above), the dedicated data bit may be either the least or most significant bit for example, with the remaining 7 bits reserved for encoding 128 device commands. Where more than 128 device commands are desired, then as many data bits are transmitted between the remote control and the STB as necessary to encode the command and the device status data marker.

The STB is then configured to scan the data commands received from the remote control to determine the state of the device status data bit. For example, a bit set to a 'one' can be used as the data marker to indicate that the remote control has not yet been configured to operate with any particular AV equipment. In this case, if the STB detects this situation, it will prompt the user to enter the configuration process on the STB. This will be described in more detail in connection with the figures below. A zero bit could of course be used to represent this information, or indeed any other physical encoding of data suitable for appending to the regular control codes, or transmitting between the remote control 6 and the STB 2.

An alternative method using the same principal is to append an extra command code to every transmission when the remote control has not yet been configured, and to stop appending this command code, or append an alternative command code, when the remote control has been configured. It will be appreciated that it is equally possible to send the transmissions without an extra command code when the remote control is not configured, and to append the extra command code when the remote control is configured.

For example, where the STB has a device address of 37, and the command codes corresponding to the keys of the remote control range from 0 to 5, a command code to indicate that the remote control is not configured could be code 51. If command code 3 corresponds to pressing the number key "3" on the remote control, then if the remote control is not configured it would transmit the codes 37, 3, 37, 51, in the pattern address, command, address, command. On the other hand, when the remote control is configured, it would send the codes 37, 3. In both cases, the appropriate modulation for the chosen IR protocol is assumed.

In another example, the STB determines whether or not the STB has been configured to operate with an audio video device without the need for providing a dedicated flag in the remote control command. This is achieved by looking at the behaviour of the user using the remote control and making an inference about whether the programming procedure has been carried out. For example, once programmed, the TV selector button 20*d* is configured to change the power on/off command from a command addressing the STB to a command addressing the connected television.

In the case that the button has not yet been configured but user believes that it has, the user may press the television selector button 20*d* followed by the power button 20*c* in order to operate the power on the television. As the button has not yet been configured however, the effect will be to turn off the STB instead. If the user intended to turn off the television, the user will likely press the power button 20*c* again (turning the STB back on), before repeating the operation of the television selector button 20*d* followed and the power button 20*c*. This will again turn the STB off, and the user will have to turn the STB back on once more. This double power-on/off action in quick succession can be used as an indicator that the remote control is not yet configured properly, and the STB displays on the screen of the connected television an invitation to start up the configuration process.

An additional, indicator that the remote control might not be configured correctly is user interaction with the volume control buttons. In one scenario, the design of the remote control may mean that operation of the volume control buttons is not changed by interaction with the control selector buttons god. This means that when the remote control is not configured to control the television, the volume control buttons will always control the volume via the STB, and when the remote control is configured to operate the television, the volume control buttons will always control the volume via the television. In this scenario, when the STB receives a volume control command from the keyboard, it will be able to discern whether the remote control has been programmed to control the television based entirely on the fact that the volume control command was addressed to the STB and not to the television. The STB can then invite the user to enter the configuration process for the remote control.

Consideration will now be given to a more complex scenario in respect of the volume control commands. This will arise either where the control selector buttons 20*d* have the ability to change the device to which the command is addressed but in an unconfigured remote control do not yet do so. When the remote control is not yet configured to control the volume on the television, then the gain applied by the STB volume and the television combines in series. If the STB detects that its volume setting is at a maximum, but the user is continuing to press the volume up buttons 20*a* on the remote control, it would indicate that the volume control on the television has been turned down low, and that the user has perhaps forgotten this. In this case, continued operation of the volume up button when the volume is already at a maximum on the STB would cause the STB to invite the user to enter the configuration process.

A further example is interaction with the input selector buttons 20*e*, or any other button that performs a function intended for a connected device rather than the STB. Until configured to operate with the television or other device, these buttons will have no effect on the television or other device, but will be designed to transmit a signal to the STB to acknowledge the key press. Once configured properly, the STB should not see these signals (as the STB itself is not connected to the individual inputs and has no need of the commands). The STB can invite the user to begin the configuration process if it detects these commands.

Furthermore, a user who expects the key to have an effect on the connected television will likely press the button on the remote control a number of times before, putting the STB remote control down, searching for the television remote control and pressing the corresponding buttons on that device. The repeated operation of the buttons on the STB remote control, followed within a short period of time later by the use of the television remote control can again be used as a prompt to ask the user to enter the configuration process.

Figure 3:
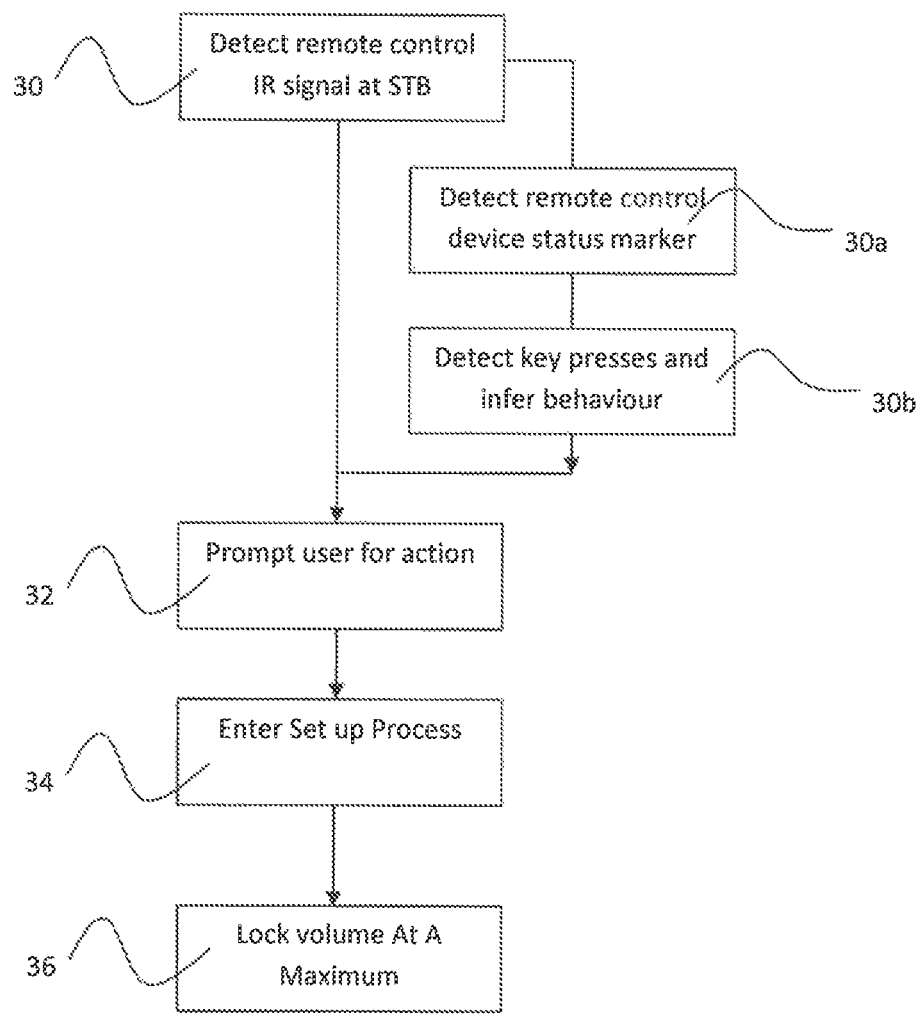
FIG. 3 is a flow chart illustrated the operation of the method in an embodiment of the invention.

The operation of the STB will now be described in more detail with FIG. 3. At the beginning of the process illustrated in FIG. 3, the STB is assumed to powered-on and in normal operation, in other words outputting a user selected video signal to a video output, and monitoring commands received from the STB remote control. The STB is configured to monitor the commands received from the remote control and determine whether configuration is required. There is therefore no requirement for the user to manually select a programming or configuration mode, though this can be available as an option.

In step 30, the STB detects a remote control command. The remote control command acts as a trigger causing the STB in step 32 to prompt the user to program the remote control to operate a connected device, such as a television. Any remote control command may act as a trigger. As noted above, in one embodiment, each of the remote control commands transmitted to the STB may be set with a flag indicating whether or not the remote control has been programmed or is still in its default state. In this case, the STB detects in step 30*a* whether the remote control device status marker is present in the received command and prompts the user to take action accordingly. In another embodiment, in step 30*b*, the remote control may detect unprogrammed (programmable) remote control keys being pressed, or detect a number of keys being repeatedly pressed in short succession, followed by remote control commands not addressed to the STB, transmitted from a separate remote control dedicated to the other device. The latter commands will be received at the STB, but will only be understandable to the STB if the STB has a database for other device control commands stored in memory. If the STB recognises from its database that the command addressed to another device corresponds to the intended function of the non-programmed remote control key, then detection of unprogrammed keys can be carried out with a high level of confidence. It would also be possible to identify the device being used with the STB from the identified command. However, this may require a large database of commands stored in memory in the database and may not strictly be necessary. It would be sufficient simply to detect the coincidence in time of the STB remote control unprogrammed key press followed by one or more unrecognised commands.

In various embodiments, steps 30a or 30b may be used as alternatives to one another, or in combination with one another.

Thus, if in step 30 the STB detects that the remote control device has not yet been configured to operate with another device, it proceeds to step 32 and prompts the user to begin the configuration process. The prompt is preferably a text or audio prompt, output to the connected television or display via the STB's video output. Control logic in the STB then awaits an input received from the remote control device in response to the prompt. For example, the STB might cause the television screen to display the prompt "The remote control has not been configured to work with your connected equipment. Would you like to set-up the remote control now? Green Button, Yes: Red Button, No:", and then wait for the user to indicate, using the red or green buttons, their preference. Alternately, the prompt may be displayed on an indicator panel on the STB, or be output from a speaker in the STB housing. An example of a prompt is illustrated in FIG. 4a.

If in step 32, the user does not elect to begin the configuration process, then the STB returns to normal operation. In step 30, the STB would then be set to ignore the device status marker codes transmitted with the remote control command codes. Step 30a would then not act to trigger the prompt in step 32. The STB may however be set to ignore the codes for a period of time (say 1 week) before prompting the user again.

If the user selects the 'no' option in step 32 causing normal operation of the STB to resume, the STB will continue to monitor repeated key presses or unprogrammed key presses in step 30b and prompt the user accordingly.

In either case, a "Do not ask me again" option presented with the prompt in step 32 allows for the user to switch off the data marker detection function or the repeated key press detection function of the STB if desired.

If in step 32, the user elects to begin the configuration process, then the STB enters a remote control configuration mode in step 34 in which it attempts to guide the user though a configuration process for the remote control. FIG. 4 shows an example graphical user interface generated by the STB and output to a display device for viewing. The purpose of the graphical user interface is to guide the user through the necessary steps to update their remote control. This process may be referred to as a 'wizard' as is known in the art.

The graphical user interface presents on screen in a step wise manner the necessary instructions for programming the remote control. Preferably, these instructions and the options presented by the GUI are tailored to the user, the user's location and the STB equipment.

Preferably, the user interface asks the user to indicate what television they have. See FIG. 4b. Options can be made available to the user via a drop down menu, listing manufacturer and model details. Alternatively, the user may be asked to enter their television manufacturer and model number in a text-entry box. The alpha numeric keys 16 and the menu option selection buttons 18 may be used to do this.

In other embodiments, the user may be instructed to press one or more buttons on the remote control supplied with the television. The STB, having prompted the user to press the button and instigate the transmission of this command to the television, can detect the command and compare it with commands stored in memory thereby identifying the manufacturer and model of television in use.

Once a manufacture and model has been selected, or as part of the selection process itself, the graphical user interface may display a photograph or illustration of the television on screen. This allows the user to confirm that the details of the connected device are correct, or allows them to be sure they have selected the correct device and communicated this to the STB.

The wizard then asks the user to confirm that they wish to continue with programming the remote control, for example by pressing both the left and right directional buttons together. See FIG. 4c. The exit button remains available to leave the process at any time. Pressing the buttons indicated by the STB indicates to the STB that the user wishes to continue, and additionally puts the remote control into a learning mode in which it is receptive to receive commands from the user. The same key combination is programmed into the remote control in advance so that the user can cause the remote control to enter the programmable mode when prompted by the STB. In alternative embodiments, the STB may transmit a signal to the remote control, either sending IR signals to an IR receiver on the remote control, or via UHF, RF4CE, or any other suitable method.

If the user presses the designated buttons to proceed, then the remote control 10 enters the programming or configuration mode, and the STB 2 continues with the operation of the wizard. The STB 2 instructs the user, for each of the keys on the remote control that are programmable, to press the key and to enter the necessary command code for that key. See FIG. 4d. The control commands are stored in memory of the STB for the device indicated by the user and displayed on the screen of the wizard. It is considerably easier to store all of the necessary control codes for connected devices in the memory of the STB than make this information available on the remote control from the outset. Furthermore, the wizard only shows the codes relevant to the connected device to the user, and not codes that correspond to other devices that are not relevant.

In this way, the user is instructed to program the remote control key with the correct code for controlling the connected television. Furthermore, the STB can monitor the programming operation through the key presses of the user operating the remote control, which will in turn be received at the STB. If the user does not press the key displayed on the screen of the wizard, or if the user does not enter the control code correctly, the STB can alert the user and ask them to repeat the programming action.

In step 36, the STB completes the configuration wizard. The STB then sets the output volume of audio signals sent to the AV output at a maximum and disables its volume control. The volume control buttons of the STB 20a will now of course control the volume control setting of the connected television. This action does however avoid the STB being left on mute or on low volume with no way to correct it. For good measure, the user is preferably warned to turn the TV's volume down before the STB output volume is initially set at a maximum. Further, once the STB volume control has been disabled and the volume set at a maximum, the user is notified that this has happened, and preferably warned to turn the TV's volume down before the STB's volume is set to a maximum. The Wizard is then closed and normal operation of the STB and remote control continues.

With an IP connected STB, the database of control commands stores in memory can be kept up-to-date over time, and any errors can be corrected.

In a further embodiment, the STB may have control functionality for determining at least in part the model and manufacturer of the connected television. This means that the user does not have to enter the model and manufacturer details as illustrated in FIG. 4b, or at least is assisted in their input by being presented with a sub-selection of devices from which to choose. This function can be achieved by software in the STB querying the HDMI connection through which the STB is connected to the television. For example, the HDMI E-EDID (High Definition Multimedia Interface Enhanced-Extended Display Identification Data) standard allows manufacturers of audio/visual apparatus to store data indicating the playback capabilities of the device, such as supported video modes, aspect ratios, frames per second, timing details, screen resolution and so on. This information allows a video output device to query the audio/visual apparatus and determine how video information should be output. The same information can be queried by the STB to determine the likely identity of the model and manufacturer of the connected television set. As not all apparatus provide identical playback capabilities, differences in the capabilities provided by different apparatus may be used to identify them. A database of candidate model and manufacturer numbers are stored in the STB, and the STB compares the information it receives from the HDMI connection with the data stored in the database. In this way the HDMI data can be used in a similar way as a fingerprint to identify the device. Where more than one apparatus has the same playback capability data, a list of options can be presented to the user for the user to select the correct device. Specifically, the Vendor Specific Data Block (VCDB) may include sufficient information to identify the manufacturer of the device, and potentially the model. The Video Capability Data Block (VCDB) and Short Audio Descriptors may also be useful in this respect. Other items in the CEA extension Version 3 defined in CEA-861-F may be useful. Where more information is available over HDMI or any future interface, this too can be used to provide a direct indication of the connected device, or infer the identity of the device by a finger printing and matching process, or at least narrow down the options.

Any other connection standard used by AV equipment manufacturer's to communicate supported functionality or playback capabilities can be used in this way, such as the SCART Databus or AV link.

A number of different variations on the above method are contemplated. For example, in embodiments where the STB is able to transmit signals to the remote control by IR, UHF, or RF4CE interface, or indeed any other suitable method, the STB may program the remote control automatically on behalf of the user.

Embodiments of the invention may also involve intelligent or programmable remote controls that learn the appropriate control codes from the dedicated remote control of the other device. In this example, the flag used in the STB remote control to indicate the remote control configuration is monitored by the STB, or the user behaviour is monitored as before. Again if the STB determines that the remote control has not yet been programmed by a user, then the STB initiates the configuration procedure described above.

The on-screen instructions presented to the user via the wizard would then simply instruct the user on how to operate the two remote controls (that of the STB and that of the connected device) so that the STB remote control is programmed with the codes from the remote control of the other device. The instructions would instruct the user of which key presses are required to have both remote controls enter the learning mode, and guide the user through a suitable order for programming all of the relevant keys on the STB remote control.

Alternatively, the STB may detect the command codes from the other remote control and store these in memory for later use, and present these on screen in digital or numeric form for the user to input to the remote control. In this way the STB and its remote control can learn to operate any device via any remote control codes without the expense of incorporating an IR receiver in the remote control.

The guided configuration procedure described above allows for more complex interaction between the STB remote control and the functions of any connected AV equipment. It also allows remote controls to be future proofed so that they can control TVs released after the remote control is released and shipped. As the example embodiments reside in the software of the STB, the improved functionality can be implemented without making the remote control more complicated.

Although a number of different embodiments have been described, these are intended to be purely illustrative and not limiting of the invention as defined by the claims.

Although in the above examples the remote control is described as receiving input commands from a user via key or button presses, this is not intended to be limiting. The remote control may therefore comprise any suitable input controls such as a touch screen control, mouse pad or mouse point, a tracker ball, joystick or paddle configuration, or audio voice command receiver, in addition to keys or buttons or instead. Further although the remote control is described as comprising an infra-red receiver/transmitter, any suitable transmission means or transmission frequency may be used.

Further, where features have been described in different embodiments, it will be appreciated that these can be used in combination with each other or in isolation. Where processes have been described it will be appreciated that these can be implemented in software or hardware.

What is claimed is:

1. A method executable by a first audio/visual device for configuring a remote control device, wherein the remote control is pre-programmed with control codes for controlling a first audio/visual device and is programmable with control codes to control a second audio/visual device, the method comprising:

receiving a sequence of key presses made by a user of the remote control device at the first audio/visual device, wherein none of the key presses corresponds to a manual selection of a programming or configuration mode by the user;

processing the sequence of key presses by the first audio/visual device to thereby automatically detect, by the first audio/visual device without the user manually selecting a programming or configuration mode, that the remote control is unconfigured with respect to control of a second audio/visual device separate from the first audio/visual device; and in response to the first audio/visual device automatically detecting that the remote control is unconfigured with respect to the control of the second audio/visual device, the first audio/visual device controlling an audio or visual output of the first audio/visual device to output instructions that prompt the user to configure the remote control for control of the second audio/visual device.

2. The method of claim 1, wherein the instructions output via the audio or visual output prompt the user to select a key on the remote control to be programmed, and to enter a sequence of keys on the remote control to configure the selected key for control of the second audio/visual device.

3. The method of claim 1, wherein in the processing step, the first audio/visual device further analyzes commands received from the remote control for the presence of a signal indicating whether the remote control is in an unconfigured state with respect to control of the second audio/visual device.

4. The method of claim 1, wherein the commands received from the remote control comprise a plurality of data bits and the signal comprises one or more dedicated data bits in the plurality of data bits indicating whether the remote control is configured to control a second audio/visual device.

5. The method of claim 1, wherein in the processing comprises the first audio/visual device automatically entering a remote control programming mode based on the pattern of key presses.

6. The method of claim 1, wherein the first audio/visual device outputs audio/visual data at a user controlled volume setting, and wherein the processing comprises:
the first audio/visual device querying the volume setting for the output of audio/visual data;
the first audio/visual device analyzing the key presses made by the user via the remote control;
if the volume setting is at a maximum, and the first audio/visual device receives via the remote control a plurality of volume-up commands, determining that the remote control is unconfigured to control a second audio/visual device.

7. The method of claim 1, wherein if the first device identifies that the user presses multiple times remote control keys that are programmable, the processing comprises determining that the remote control is unconfigured to control the second audio/visual device.

8. The method of claim 1, wherein the instructions output via the audio or visual output prompt the user to input the model number and manufacturer of the second audio/visual device to the first device.

9. The method of claim 1, wherein the controlling an audio or visual output of the first audio/visual device includes outputting commands to update a display screen of a connected device, displaying instructions for configuring the remote control on the display screen, awaiting key presses on the remote control according to the instructions, and/or notifying the user if the user enters incorrect key presses.

10. An audio/video device comprising:
a processor for controlling the operation of the audio/video apparatus;
a remote control command receiver for receiving commands from a corresponding remote control, wherein the remote control is pre-programmed with control codes for controlling the audio/visual device and is programmable with control codes to control a second audio/visual device, the commands received from the remote control being received and interpreted by the processor;
an audio or visual output for outputting audio or visual data to a user;
wherein the processor is operable to:
receive a sequence of commands from the remote control based upon key presses made by the user, wherein none of the key presses corresponds to a manual selection of a programming or configuration mode by the user;
automatically detect, based upon the received sequence of commands, that the remote control is unconfigured with respect to control of a second audio/visual device; and
control the audio or visual output to prompt the user to configure the remote control to control the second audio/visual device, and output instructions via the audio or visual output for configuring the remote control.

11. The audio/visual device of claim 10, wherein the instructions output via the audio or visual output prompt the user to press a key on the remote control to be programmed, and enter a sequence of keys on the remote control to configure that key for control of the second audio/visual apparatus.

12. The audio/visual device claim 11, wherein in the detecting step, the audio/visual device analyses the commands received from the remote control for the presence of a signal indicating whether the remote control is in an unconfigured state with respect to control of the second audio/visual device.

13. The audio/visual device of claim 10, wherein the commands received from the remote control comprise a plurality of data bits and the signal comprises a dedicated data bit in the plurality of data bits indicating whether the remote control is configured to control the second audio/visual device.

14. The audio/visual device of claim 10, wherein the processor automatically enters a remote control programming mode in response to automatically detecting based upon the received sequence of commands that the remote control is unconfigured with respect to control of a second audio/visual device.

15. The audio/visual device of claim 10, wherein the audio/visual device is operable to output audio/visual data at a user controlled volume setting, and the processor is operable to:
query the volume setting for the output of audio/visual data;
analyze the key presses made by the user via the remote control;
if the volume setting is at a maximum, and the processor receives via the remote control a plurality of volume-up commands, determine that the remote control is unconfigured to control a second audio/visual device.

16. The audio/visual device of claim 10, wherein if the processor identifies that the user presses multiple times remote control keys that are programmable, the audio/visual device may determine that the remote control is unconfigured to control a second audio/visual device.

17. The audio/visual device of claim 10, wherein the instructions output via the audio or visual output prompt the user to input the model number and manufacturer of the second audio/visual device to the first audio/visual device.

18. A remote control for controlling an audio/visual apparatus, wherein the remote control is pre-programmed with control codes for controlling the audio/visual device and is programmable with control codes to control a second audio/visual device, the remote control comprising:
- a plurality of input controls;
- a transmitter for transmitting remote control commands to the audio/visual apparatus;
- a memory for storing a configuration status signal automatically indicating that the remote control is configured or unconfigured to control a second audio/visual device without a user manually selecting a programming or configuration mode;
- a processor for detecting key presses of the input controls and for operating the transmitter to send a remote control command to the audio/visual device based on the key presses, wherein the processor is operable to:
  - receive a sequence of key presses made by a user of the remote control device at the audio/visual device, wherein none of the key presses corresponds to a manual selection of a programming or configuration mode by the user;
  - provide the sequence of key presses to the audio/visual device for processing of the sequence of key presses by the audio/visual device that automatically detects, without the user manually selecting a programming or configuration mode, that the remote control is unconfigured with respect to control of a second audio/visual device separate from the audio/visual device; and
  - if the audio/visual device automatically detects that the remote control is unconfigured with respect to the control of the second audio/visual device, enter a configuration mode with the audio/visual device to configure the remote control for control of the second audio/visual device.

19. The remote control of claim 18, wherein the transmitter is operable to transmit remote control commands to the audio/visual apparatus that include a plurality of data bits and the processor is operable to set a dedicated data bit in the plurality of data bits based on the configuration status signal.

20. A non-transitory computer readable medium on which computer code is stored, wherein when the computer code is executed by the processor of an audio/visual device communicating with a remote control device, the audio visual device is caused to:
- receive a sequence of key presses made by a user of the remote control device at the audio/visual device, wherein none of the key presses corresponds to a manual selection of a programming or configuration mode by the user;
- process the sequence of key presses by the audio/visual device to thereby automatically detect, by the audio/visual device without the user manually selecting a programming or configuration mode, that the remote control is unconfigured with respect to control of a second audio/visual device separate from the audio/visual device; and
- in response to the first audio/visual device automatically detecting that the remote control is unconfigured with respect to the control of the second audio/visual device, the audio/visual device controlling an audio or visual output of the audio/visual device to output instructions that prompt the user to configure the remote control for control of the second audio/visual device.

* * * * *